United States Patent
Cusine Barber

(10) Patent No.: US 9,266,680 B2
(45) Date of Patent: Feb. 23, 2016

(54) CONVEYOR SYSTEM FOR FORAGE BALES AND MACHINE FOR HANDLING FORAGE BALES INCLUDING SAID SYSTEM

(75) Inventor: Manuel Cusine Barber, El Palau d'Anglesola (ES)

(73) Assignee: ARCUSIN, S.A., Vila-Sana, Lleida (ES)

(*) Notice: Subject to any disclaimer, the term of this patent is extended or adjusted under 35 U.S.C. 154(b) by 0 days.

(21) Appl. No.: 14/128,068

(22) PCT Filed: May 15, 2012

(86) PCT No.: PCT/ES2012/070344
§ 371 (c)(1),
(2), (4) Date: Mar. 31, 2014

(87) PCT Pub. No.: WO2012/175769
PCT Pub. Date: Dec. 27, 2012

(65) Prior Publication Data
US 2014/0339053 A1    Nov. 20, 2014

Related U.S. Application Data

(60) Provisional application No. 61/571,165, filed on Jun. 22, 2011.

(30) Foreign Application Priority Data

Jun. 21, 2011    (EP) .................................. 11382212

(51) Int. Cl.
| | | |
|---|---|---|
| A01D 87/12 | (2006.01) | |
| B65G 19/02 | (2006.01) | |
| B65G 19/30 | (2006.01) | |
| A01D 90/08 | (2006.01) | |
| B65G 19/22 | (2006.01) | |
| B65G 19/24 | (2006.01) | |
| B65G 37/00 | (2006.01) | |

(52) U.S. Cl.
CPC ............... *B65G 19/02* (2013.01); *A01D 87/12* (2013.01); *A01D 90/08* (2013.01); *B65G 19/225* (2013.01); *B65G 19/245* (2013.01); *B65G 19/30* (2013.01); *B65G 37/00* (2013.01)

(58) Field of Classification Search
CPC .............................. B65G 19/245; A01D 87/12
See application file for complete search history.

(56) References Cited

U.S. PATENT DOCUMENTS

| | | | | |
|---|---|---|---|---|
| 2,316,313 | A * | 4/1943 | Bruton ................. | B65G 19/245 198/692 |
| 3,036,688 | A * | 5/1962 | Walhof .................. | A01D 87/12 198/399 |
| 3,103,274 | A * | 9/1963 | Mayrath .............. | A01D 87/122 198/600 |
| 3,690,473 | A * | 9/1972 | Miguel ................. | A01D 90/08 414/789.7 |
| 3,722,722 | A * | 3/1973 | Blair ........................ | B60P 1/38 198/518 |
| 4,077,531 | A * | 3/1978 | Van Doorn ........... | A01D 90/105 19/80 R |

(Continued)

*Primary Examiner* — Gene Crawford
*Assistant Examiner* — Thomas Randazzo
(74) *Attorney, Agent, or Firm* — Barnes & Thornburg LLP

(57) ABSTRACT

Conveyor system (1) for forage bales (2) comprising driving means (3) for said forage bales (2) and dragging means (4) for said driving means (3) for moving said bales (2) along a conveying direction, and it is characterized in that said driving means (3) are rotatably mounted about a longitudinal axis ("Y") of said dragging means, said driving means (3) being susceptible to freely rotate about said axis ("Y") to permit the relative movement of the bales (2) with respect to said dragging means (4). The system prevents the breakage of tie threads, permits to auto-align the bales and permits the bales to trace curved paths with a very little rotation radius.

13 Claims, 9 Drawing Sheets

(56) References Cited

U.S. PATENT DOCUMENTS

| | | | | |
|---|---|---|---|---|
| 4,248,561 A | * | 2/1981 | Graves | A01D 90/083 198/518 |
| 4,930,617 A | * | 6/1990 | Lavoie | A01D 87/12 198/692 |
| 5,806,659 A | * | 9/1998 | Middelberg | B65G 19/20 198/731 |
| 6,817,820 B2 | * | 11/2004 | Ackerman | B60P 1/483 198/468.2 |
| 7,044,290 B2 | * | 5/2006 | Garbagnati | B65G 17/086 198/850 |
| 7,357,245 B2 | * | 4/2008 | Lee | B65G 17/061 198/370.09 |

* cited by examiner

CONVEYOR SYSTEM FOR FORAGE BALES AND MACHINE FOR HANDLING FORAGE BALES INCLUDING SAID SYSTEM

CROSS-REFERENCE TO RELATED APPLICATIONS

This application is a national stage entry under 35 U.S.C. §371(b) of International Application No. PCT/ES2012/070344, filed May 15, 2012, which claims the benefit of European Patent Application Serial No. 11382212.6, filed Jun. 21, 2011 and U.S. Provisional Application Ser. No. 61/571,165 filed Jun. 22, 2011, the disclosures of all which are hereby incorporated herein by reference.

The present invention refers to a conveyor system for forage bales and to a machine for handling forage bales including said conveyor system.

BACKGROUND OF THE INVENTION

There are known forage bales of prismatic kind that are formed in packers that compact the material and tie it by thread.

The conveyor systems of said forage bales must have special care with the threads that tie the bale to prevent the breakage of these threads and the bale to be loosened.

In the market there are conveyor systems for forage bales comprising driving means for said bales and dragging means of said driving means to move said bales along a conveying direction.

One of the conveyor systems usually used is that which consists in a dragging chain provided with rigid teeth. This system presents the advantage, with respect the other existing systems, that the teeth stick in the bales obtaining this way a suitable drive to move securely the bale along a sloping surface.

Therefore, the chains provided with teeth are usually used in bale grouping machines, or in bale auto-charging machines, to collect the bale from the ground. However, the conveyor systems based on chains provided with teeth have a lot of drawbacks.

One of the main drawbacks of the systems based on teeth chains is that the teeth often cause the breakage of the bale threads, because once stuck, they prevent the relative movement of the bale with respect to the chain, being impossible to release the thread from the tooth if said tooth has trapped a thread.

Another drawback of the teeth chains is the fact that it is a conveyor system that does not permit to trace curved paths with a little turn radius to change the conveying direction of the bales. This is because a turn necessarily involves a movement of the bale with respect to the chain that, in this case, is prevented by the teeth.

Another added drawback of the conveyor systems based in tooth chains is that to move the bales according to a direction transversal to the conveying direction it is necessary to release previously the bales from the teeth, which converts an "a priori" simple operation, as would be to remove the bale from the conveyor line, in a very complex operation.

DESCRIPTION OF THE INVENTION

The object of the present invention is to solve said drawbacks, developing a conveyor system for forage bales presenting the advantages that will be described hereinafter.

According to this object, according to first aspect, the present invention provides a conveyor system for forage bales comprising driving means for said forage bales and dragging means of said driving means to move said bales along a conveying direction, characterised in that said driving means are mounted rotatable about a longitudinal axis "Y" of said dragging means, said driving means being susceptible to freely rotate about said axis to permit the relative movement of the bales with respect to said dragging means.

According to the same object, according to a second aspect, the present invention provides a machine for handling forage including said conveyor system.

The system of the present invention has the advantage that the driving means of the bales are mounted rotatable about a longitudinal axis "Y" of the dragging means, so that said driving means are susceptible to freely rotate about said axis to move said bales according to a direction different from the conveying direction, e.g. according to a direction transversal to the conveying direction.

Thanks to this feature, differently from what happens in the prior art conveyor systems, said driving means for the bales permits the relative movement of the bales with respect to the dragging means. Therefore, the bale can be moved in a direction different from the conveying direction when it is conveyed, which provides a lot of advantages to the system.

A first advantage is that the system prevents the breakage of the tied threads because, if the driving means trap a thread, this thread can be released with no breakage when the driving means rotate, transversally moving the bale with respect to the conveying direction.

A second advantage is that the system permit to auto-align or reposition the bales by guides along the conveying direction with no breakages of the threads, as it occurs with the prior art systems, because in the system of the present invention, the bales can be moved in a direction different from the conveying direction when they are conveyed.

A third advantage is that the system permit the bales to trace curved paths with a very little rotation radius to change the conveying direction, because in this case the driving means does not prevent the rotation of the bale to be adapted to the curve.

The fourth advantage is that the system permits to remove the bales from the conveying line in a very simple and easy way, because the bales can be evacuated in a direction transversal with respect to the advancing direction by an extraction system that pushes and moves them on the driving means, in a direction transversal with respect to the conveying direction.

Preferably, the rotation longitudinal axis "Y" of said driving means substantially matches with the conveying direction of said bales.

Again preferably, said system comprises holding means of the bales associated to said driving means, said holding means defining a sliding surface for the bales provided with a aperture through which the driving means for the bales protrude.

Advantageously, said holding means defines a sliding surface for the bales that is placed in a sloped plane with respect to the horizontal, said driving means permitting to drag the bales along said sloped surface.

The sliding surface can be placed on an horizontal plane or on a plane sloped with respect to the horizontal to collect e.g. the bales from the ground. In any case, this sliding surface is to facilitate the dragging of the bales.

Advantageously, said system comprises side guide means for the bales placed next to the sliding surface defined by said holding means for the bales.

These side guide permit to reposition and auto-align the bales along the conveying direction to prevent falls and thread breakages, because whey the bales abut against the guides, said bales are repositioned on the driving means, and they are guided by the guides.

According to a preferred embodiment, said dragging means includes at least a transmission chain associated with a frame, said chain being provided with support means for said driving means.

This chain can be e.g. a link chain with rolls, but any other kind of chain can be useful. On the other hand, the number of chains to be used can be changed depending on the weight and the width of the bales to be transported, and also on the inclination of the sliding surface of the bales.

Regarding the support means for the chain driving means, it can be configured e.g. by joining fins or flanges between slabs of the chain itself including housings for assembling said driving means.

Optionally, said transmission chain can comprise at least two link chain, the support means for the driving means being provided with a plurality of joining elements for said link chains.

This configuration permits to assemble driving means with a greater size, which can drag bales with greater dimensions.

Preferably, said support means comprises a holding axis for said driving means, and means for permitting the free rotation and in both directions of said driving means about said axis, such as e.g. a bush mounted on said axis.

According to a preferred embodiment, said driving means comprises a plurality of rotatable discs, which can have very different shapes.

Depending on the kind of forage or on the inclination of the sliding surface, the transmission chain is provided with a disc at each chain step or several chain steps are left between discs.

Advantageously, said rotatable discs are provided with a plurality of protrusions to make easier the bales to be driven.

As stated previously, the rotatable discs can have very different shapes. Therefore e.g. depending on the material to be transported and on the inclination of the sliding surface, the discs can be circular, with no protrusions or tips at the ends, or they can be provided with protrusions and tips, with a substantially star configuration. Similarly, the number of tips or protrusions of the same disc can change, depending on the conveying needs.

According to one embodiment, the protrusions of the discs are placed inclined forming an angle with the support plane of the discs, preferably forming an angle in the advancement direction of the bale. This embodiment of the discs makes easier the bales to be driven.

According to one embodiment of the system that permits the bales to trace curved paths, said dragging means comprises at least two dragging chains places forming an angle to each other, said two dragging chains defining a conveying path "T" for the bales substantially curve, which permits the rotation or to change the conveying direction of said bales.

Advantageously, said system comprises support means for the rotation or change of the conveying direction of the bales, said support means being placed correspondingly to the curve of conveying path "T" defined by said two transmission chains.

As stated previously, the system of the present invention presents the advantage that permits the bales to trace curved paths to change the conveying direction because, in this case, the driving means does not prevent the rotation of the bale to be adapted to the curve and prevent the breakage of the threads. Furthermore, it has been observed that surprisingly that this rotation or change of direction of the bales can be done at high speed and within a reduced space, this conveying not being conditioned to the humidity or the consistency of the forage.

Again advantageously, said support means include at least one support element placed inside the curve defining the conveying path, driving said pivot or guide like support element on which the bales rotate or change their direction.

It has been observed that, by this pivot or guide placed inside the curve, the rotation radius of the bales can be very reduced, permitting direction changes of 90° in a very reduced space or e.g. 180° rotations using in this case three dragging chains and just one pivot. However, it has been also experimented that it is also possible to trace curved paths using only side guides external to the curve defining the conveying path, not using said pivot.

BRIEF DESCRIPTION OF THE DRAWINGS

For a better understanding of what has been described some drawings are attached in which, diagrammatically and only as a non-limitative example, some embodiments are shown.

In said drawings.

DESCRIPTION OF PREFERRED EMBODIMENTS

Figure 1:
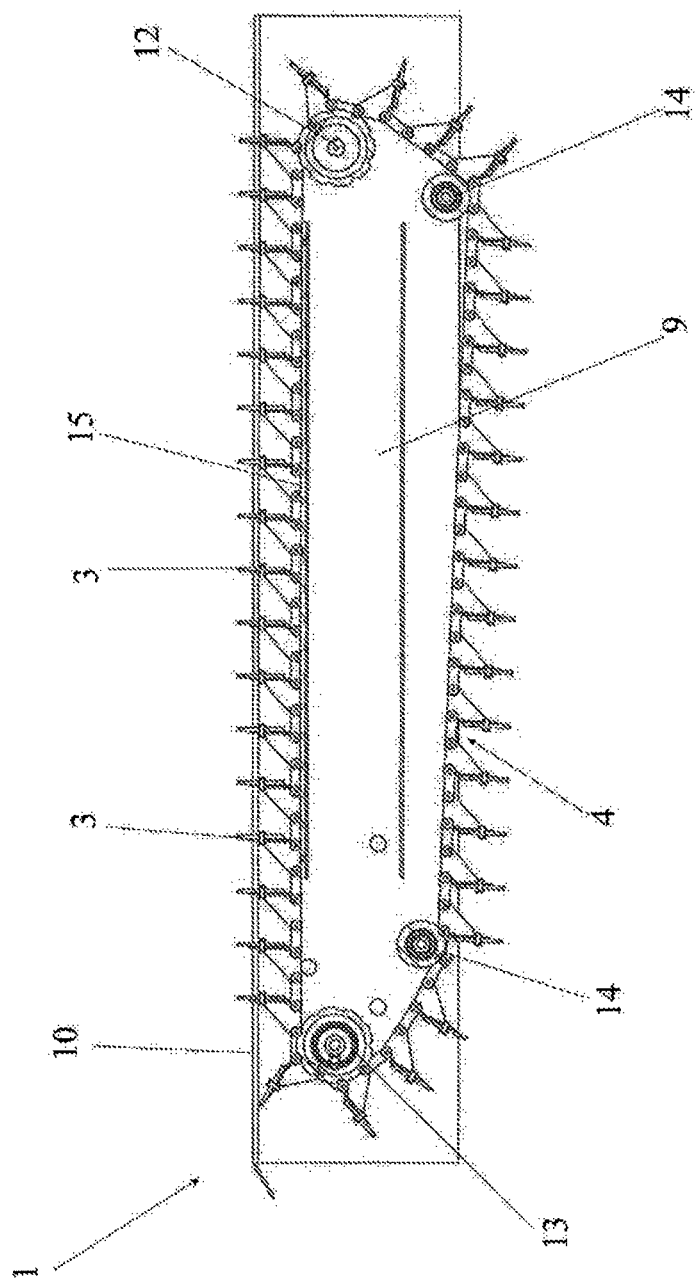
FIG. 1 is a section of a straight conveying length provided with a first embodiment of the driving means and dragging means of the system that are associated with a frame and holding means for the bales.

The attached drawings show a conveyor system 1 for forage bales 2 in which the driving means are rotatable discs 3, and the dragging means of said discs 3 are configured by one or more dragging chains 4 provided with rolls.

As stated previous in the description of the invention, said driving means 2 for the bales, in this case the discs 3, each are rotatably mounted about a longitudinal axis "Y" of the dragging means that substantially matches with the conveying direction of the roll chains 4. Thanks to this feature, the discs 3 are susceptible to rotate about said axis "Y" to permit the relative movement of the bales 2 with respect to the dragging chains 4.

Figure 3:
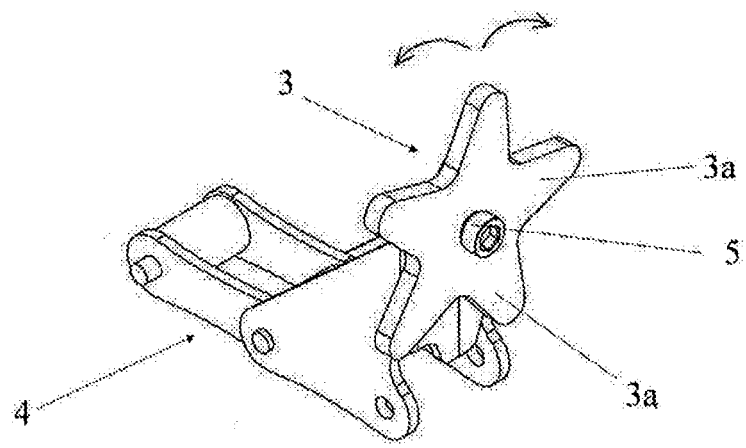
FIG. 3 is a perspective view showing a chain step and a rotatable disc of the dragging means and the driving means, respectively, of FIG. 1.
Figure 4:
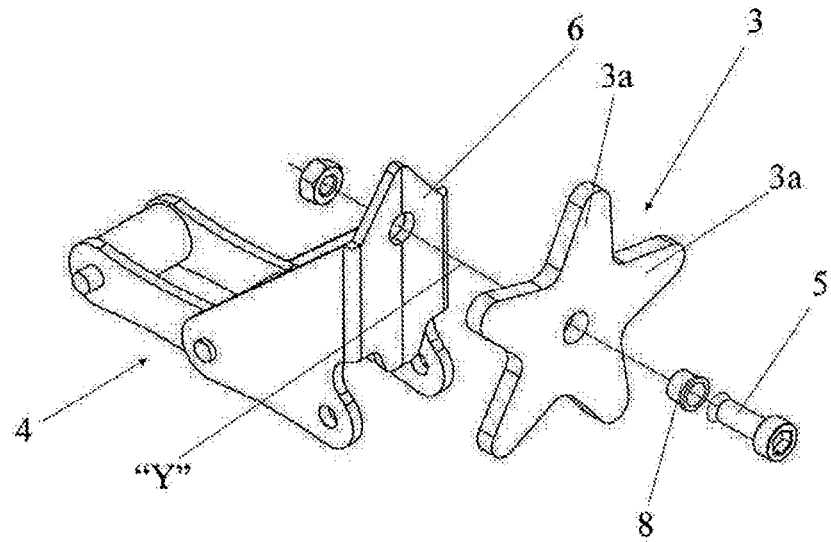
FIG. 4 is an exploded view of FIG. 3.

FIGS. 3 and 4 show a detail of a chain step 4 including a fin 6 specially configured to hold a longitudinal axis 5 for rotating and holding a rotatable disc 3. However, as stated in the description of the invention, the axis 5 for rotating and holding each of the discs 3 can be placed, instead of on a fin 6, on a joining element 7 of two link chains 4a, 4b.

Figure 5:
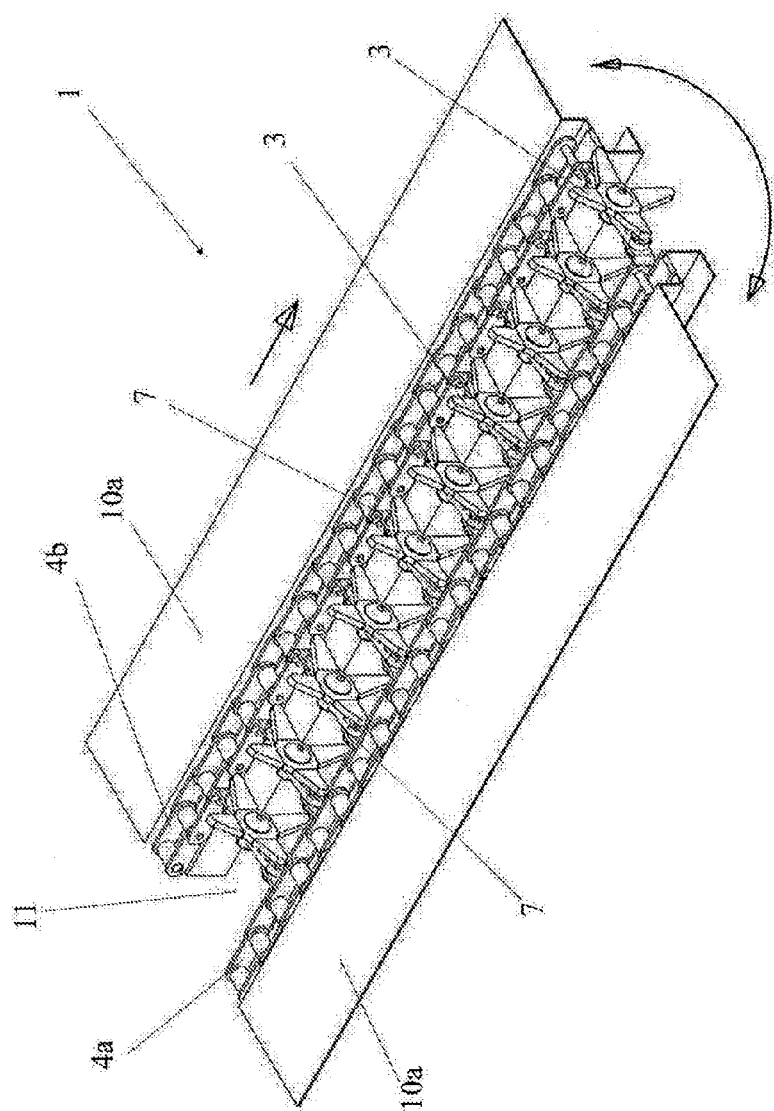
FIG. 5 is a perspective of a straight conveying length provided with a second embodiment of the driving means and the dragging means of the system that are associated with holding means for the bales.

FIG. 5 shows an embodiment of the system 1 including two link chains 4a, 4b and said joining elements 7 between the chains 4a, 4b. This embodiment has the advantage that permits the assembly of discs 3 with a greater size to drag bales 2 of greater dimensions.

As stated in the description of the invention, the discs 3 can freely rotate in both direction. To this end, it is provided that the axis 5 for rotating and holding the discs 3 to be joined to the joining elements 7, or to the fins 6 of the chain 4, through a bush 8 (see FIG. 4).

In the described embodiments, the rotatable discs 3 have a substantially star-shape configuration defining a plurality of protrusions 3a to make easier the driving of the bales 2. However, as stated previously, these discs 3 could have any other configuration, such as e.g. a circular configuration with no protrusions 3a, resulting in this case more suitable for transporting the bales 2 on flat or horizontal surfaces.

Figure 6:
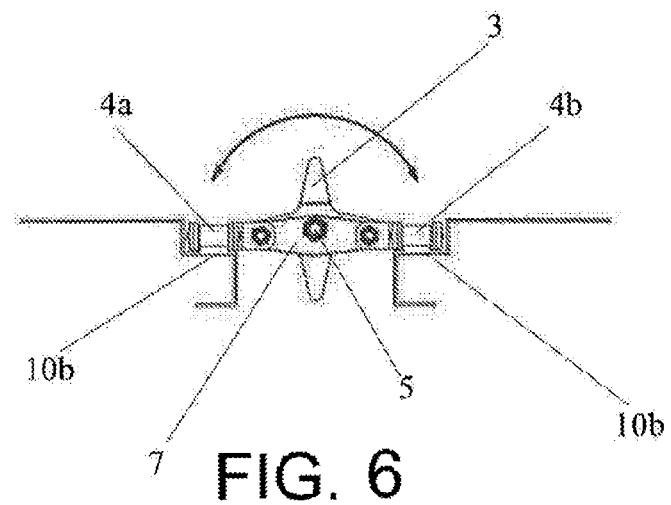
FIGS. 6 and 7 show a frontal view and a side view, respectively, of a conveying length of FIG. 5.
Figure 7:
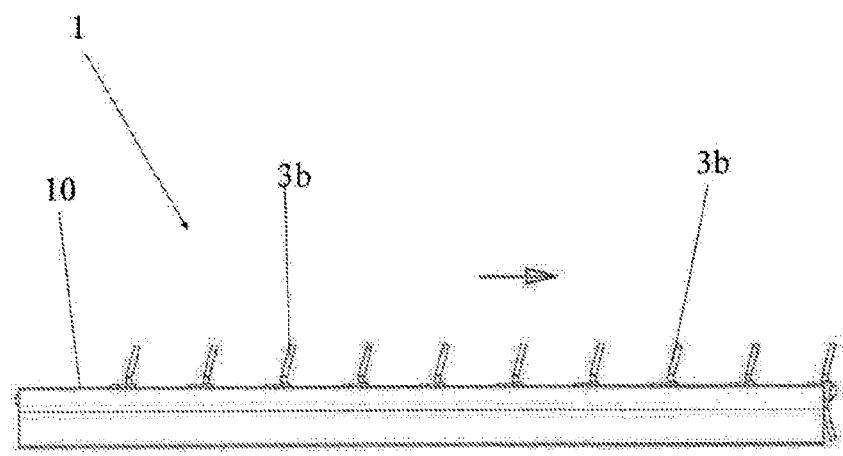

For the cases in which the bales 2 are to be conveyed on inclined surfaces, it has been provided preferably the protrusions to the placed inclined forming an angle with the support plane of the discs 3. FIGS. 5-7 show an embodiment of the system 1 including discs 3 with the protrusions 3b inclined in the advance direction of the dragging chain 4.

Figure 2:
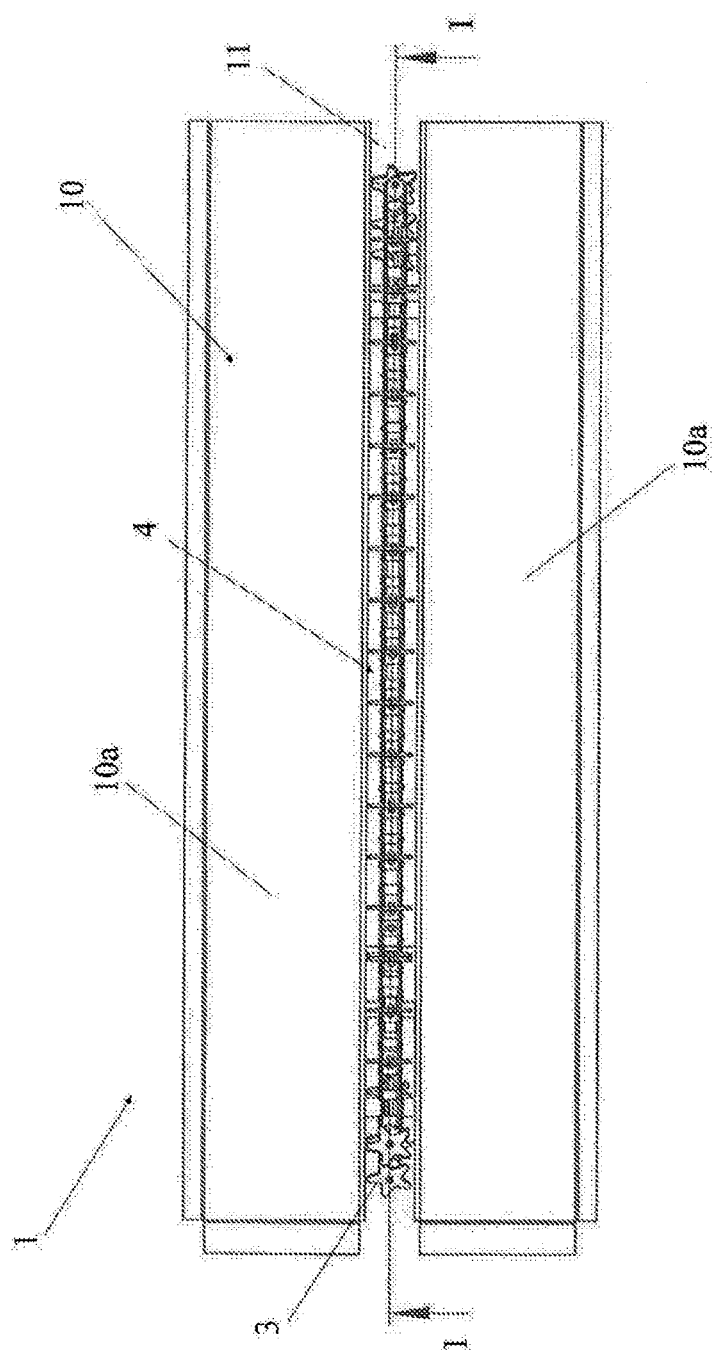
FIG. 2 shows a plan view of the straight conveying length of FIG. 1.

FIGS. 1 and 2 show a section and a plan view of a straight conveying length provided with just one dragging chain 4 that is associated to a frame 9 and to a holding plate 10 for the bales 2. This holding plate 10 defines a sliding surface 10a that is provided with an aperture 11 through which the rotatable discs 3 protrude. To move the chain 4, the frame 9 includes a driving gear 12, a driven gear 13, two drawback pulleys 14 and a guide 15 for the chain 4. The stress of the chain 4 is obtained moving the driven gear 13, or one drawback pulley 14, by stretchers, and the driving of the driving gear 12 by mechanical or electric means.

FIGS. 5-7 also show the straight conveying stretch of the system 1, even though in this case, as stated previously, the dragging means are constituted by two link chains 4a, 4b between which the rotatable discs 3 are mounted. In this embodiment, the holding plate 10 of the bales 2 includes two side grooves 10b on which the link chains 4a, 4b rest, the discs 3 also protruding through the aperture 11 defining the plate 10.

Figure 8:
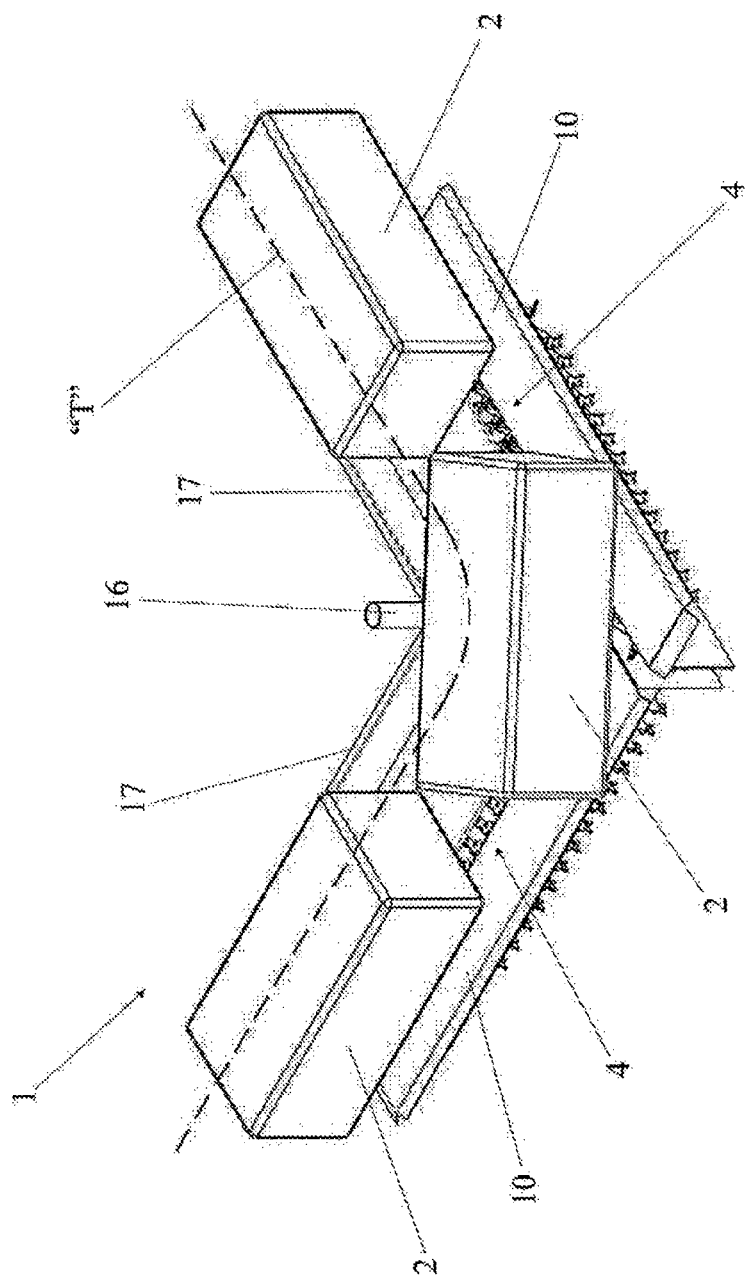
FIG. 8 is a perspective view of a conveying length provided with dragging means placed so that it defines a curved conveying path for the bales.
Figure 9:
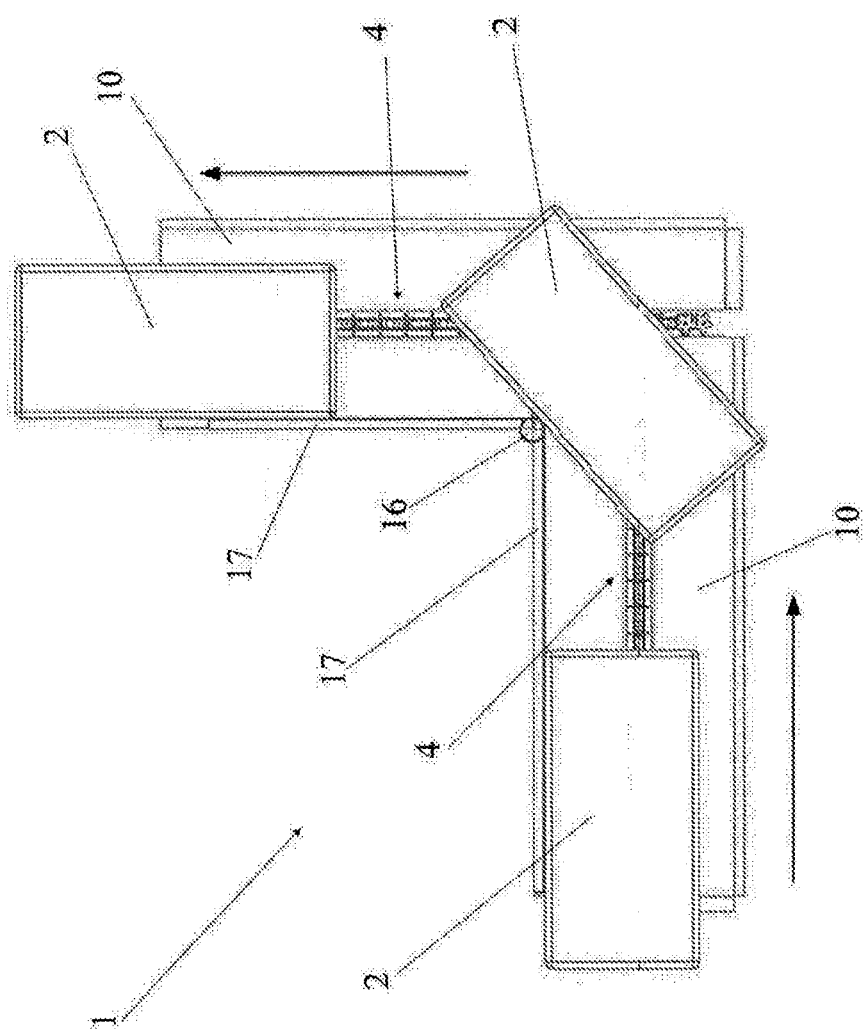
FIG. 9 is a plan view of the conveying path of FIG. 8.

FIGS. 8-9 show a conveying length defining a substantially curved conveying path "T" of the bales 2 that permits the rotation or change of the conveying direction of said bales 2.

As shown in FIG. 8-9, to define the curve path "T" two dragging chains 4 have been consecutively placed forming an angle between them that provides a rotation of direction change of the bales 2 of 90°. However, it must be pointed out that it would be possible e.g. to use three chains 4 consecutively placed to provide a direction change of 180°.

On the other hand, to permit a rotation or direction change of the bales 2 with a very little curve radius, the system 1 includes a support element 16 placed inside the curve that defines path "T", acting as a pivot or guide about which the bales 2 rotate or change their direction. Besides the element or pivot 16, side guides 17 have also been provided, which have the function of guiding the bales 2 along the path "T".

Figure 11:
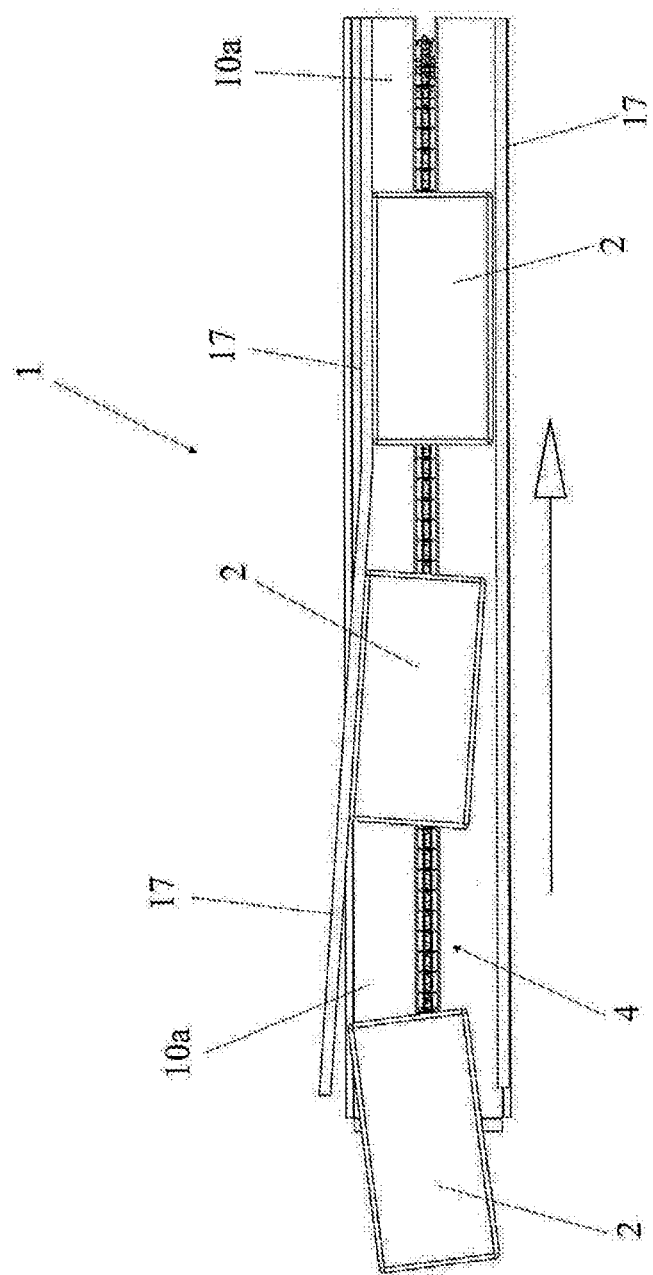
FIG. 11 shows a plan view of a conveying length provided with side guides for the bales for redirecting or auto-align said bales.

FIG. 11 shows a plan view of a straight conveying length provided with side guides 17 for the bales 2 to reposition or auto-align said bales 2.

As stated in the description of the invention, the system 1 of the present invention permits the relative movement of the bales 2 with respect to the dragging chain 4, which can be used to auto-align or reposition the bales 2 by guides 17, as shown in FIG. 11.

Hereinafter a operation mode of the system 1 is described, with reference first to a straight conveying length, and then to a curved conveying length.

In the straight length, when the bales 2 abut with the sliding surface 10a, the discs 3 that protrude from said surface 10a stick into the bales 2 pulling them in a conveying direction when the chain 4 with the discs 3 moves.

During the conveying, the rotation freedom of the discs 3 permits the bales 2 to move with respect to the dragging chain 4 according to a direction transversal to the conveying direction.

Therefore, if the discs 3 trap a tie thread of a bale 2, this thread will be released with no breakage when the discs 3 rotate and when the bale 2 moves respect to the chain 4 to release the thread.

Similarly, if the bales 2 abut with a side guide 17, they will be repositioned, being moved with respect to the chain 4 to be guided, preventing any breakage or fall.

Figure 10:
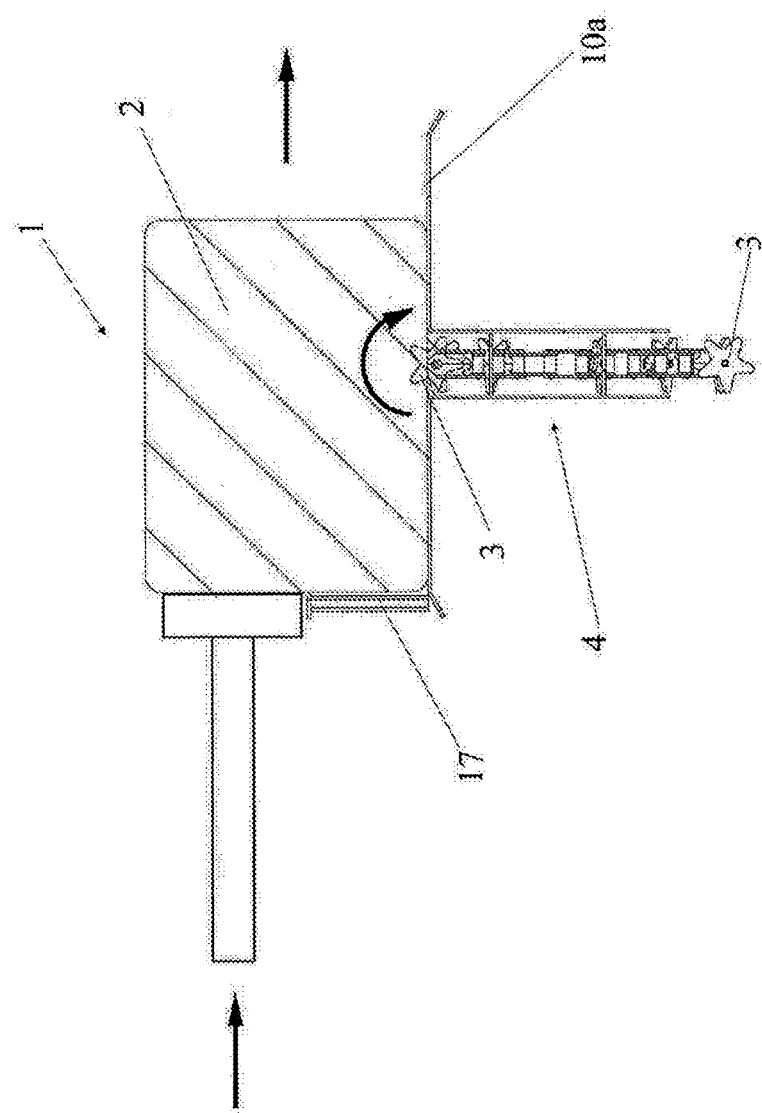
FIG. 10 shows a transversal section of a conveying length provided with a bale extraction system.

On the other hand, if the bales 2 are to be removed from the conveying length or line, it is just necessary to push the bales 2 to be moved to the discs 3 in the direction transversal to the conveying direction, this operation being remarkably simple, differently from the prior art systems. FIG. 10 shows a transversal section of a conveying length provided with a bale 2 extractor system, wherein the rotation direction of the rotatable discs 3 is indicated according to the removal transversal direction of the bales 2.

At the curved length, the bales 2 are driven by the discs 3 of a chain length 4 until one of them reaches the curve of the path "T" where the discs 3 of another chain length 4 pull them in a different conveying direction. In this moment, thanks to the rotation freedom of the discs 3, the bale 2 can be moved with respect to both chains 4 to be adapted to the curve, rotating or changing sharply the direction about the element or pivot 16.

It has been observed that this direction change or rotation can be done at high speed and in a very little space, presenting a lot of advantages in the application of the system.

Even though a specific embodiment of the present invention has been described and shown, it is clear that the person skilled in the art can introduce variations and modifications, or to substitute the details with other technically equivalent ones, without departing from the scope of protection defined by the attached claims.

E.g. even though reference is made in the present specification to conveying lengths provided with just one dragging chain 4, the same lengths could be designed with several dragging chains 4, depending the number of chains 4 on the width and the weight of the bales 2, and also on the inclination of the sliding surface 10a. Similarly, even though reference is made to driving means configured as rotatable discs 3, the same driving means of the bales 2 could be configured by another kind of rotatable elements for the same driving function. On the other hand, the number of rotatable discs 3 of the dragging chains 4 can change depending on the needs (e.g. conveying inclination or kind of forage).

What is claimed is:
1. Conveyor system for forage bales comprising
   driving means for the forage bales,
   holding means for the forage bales associated with the driving means, and
   dragging means for the driving means for moving the forage bales along a conveying direction, wherein the holding means defining a sliding surface for the forage bales provided with an aperture through which the driving means for the forage bales protrude, wherein the driving means are rotatably mounted about a longitudinal axis ("Y") of the dragging means, the driving means being susceptible to freely rotate about the axis ("Y") to permit the relative movement of the forage bales with respect to the dragging means, and wherein the rotation longitudinal axis ("Y") of the driving means substantially matches with the conveying direction of the forage bales.

2. System according to claim 1, wherein the sliding surface for the forage bales that is placed on an inclined plane with respect to a horizontal, said driving means permitting to drag the bales along said inclined surface.

3. System according to claim 2, comprising side guide means for the forage bales placed next to the sliding surface defined by the holding means for the forage bales.

4. System according to claim 1, wherein the dragging means includes at least one dragging chain associated with a frame, said chain being provided with support means for the driving means.

5. System according to claim 4, wherein the dragging chain comprises at least two link chains, the support means for the driving means being provided with a plurality of joining elements for the link chains.

6. System according to claim 5, wherein the support means comprises a holding axis for the driving means and means to permit the free rotation and in both direction of the driving means about the axis.

7. System according to claim 1, wherein said dragging means comprises at least two dragging chains consecutively placed forming an angle between them, the two dragging chains defining a substantially curved path ("T") of the forage bales that permits the rotation or change in the conveying direction of the forage bales.

8. System according to claim 7, comprising support means for the rotation or change in the conveying direction of the forage bales, the support means being placed correspondingly with the curve of the conveying path ("T") defined by the two dragging chains.

9. System according to claim 8, wherein the support means include at least one support element placed at the inner part of the curve defining the path ("T"), the support element acting as a pivot or guide about which the forage bales rotate or change their direction.

10. System according to claim 1, wherein the driving means comprises a plurality of rotatable elements.

11. System according to claim 10, wherein the rotatable elements are rotatable discs.

12. System according to claim 11, wherein the rotatable discs are provided with a plurality of protrusions to make easier the driving of the forage bales.

13. System according to claim 12, wherein the protrusions are placed inclined forming an angle with the support plane of the discs.

* * * * *